United States Patent [19]

Leedom

[11] 3,873,783

[45] Mar. 25, 1975

[54] UNIVERSAL STYLUS AND PIVOT COUPLING

[75] Inventor: Marvin Allan Leedom, Princeton, N.J.

[73] Assignee: RCA Corporation, New York, N.Y.

[22] Filed: Mar. 28, 1974

[21] Appl. No.: 455,832

[52] U.S. Cl........ 179/100.4 R, 178/6.6 A, 274/23 R

[51] Int. Cl............................ G11b 3/00, G11b 3/20

[58] Field of Search.............. 179/100.4 R, 100.1 B; 274/23 A, 23 R, 28; 178/6.6 A

[56] References Cited

UNITED STATES PATENTS

| | | | |
|---|---|---|---|
| 2,776,144 | 1/1957 | Nichols | 274/23 R |
| 3,388,912 | 6/1968 | Shimoda et al. | 274/23 R |
| 3,776,557 | 12/1973 | Rabinow | 274/23 R |

*Primary Examiner*—Terrell W. Fears
*Assistant Examiner*—Stewart Levy
*Attorney, Agent, or Firm*—Eugene M. Whitacre; William H. Meagher

[57] ABSTRACT

In a video disc playback system including a motor-board, a turntable, an information disc, a stylus, a stylus arm, and a stylus arm carrying structure, a universal stylus arm pivot coupling is provided for coupling the stylus arm to the carrying structure. The coupling comprises a generally horseshoe-shaped stylus arm holder affixed to the stylus arm. A plug, having a tapered end with a substantially circular cross-section, is fastened to the first leg of the arm holder. A support member, also generally horseshoe-shaped, is attached to the carrying structure. An opening, having dimensions permitting only a partial entry of and presenting complementary bearing surfaces for smooth engagement with the plug, is disposed in the first leg of the support member. A spring is connected between the second legs of, respectively, the arm holder and the support member. The spring member persistently urges the plug into the opening and provides tracking pressure between the stylus and the disc during playback.

4 Claims, 4 Drawing Figures

UNIVERSAL STYLUS AND PIVOT COUPLING

BACKGROUND OF THE INVENTION

This invention pertains to a universal stylus arm pivot coupling compatible with the electronic and mechanical requirements of a video disc system.

In video disc systems of a variable capacitance type, as described in detail, for example, in the copending U.S. patent application, Ser. No. 126,772 now U.S. Pat. No. 3,842,194, filed Mar. 22, 1971, for J. K. Clemens, entitled "Information Records and Recording/-Playback Systems Therefor", video information is recorded by means of geometric variations in the bottom of a smooth spiral groove on the surface of a disc. The disc surface includes a layer of conductive material which is perferably covered with a thin coating of dielectric material. A stylus engages the spiral groove and includes a conductive surface which, together with the conductive material and the dielectric coating of the disc, forms a capacitor. When the disc is rotated, and edge of the conductive surface of the stylus, while riding in the disc groove, serves as an electrode of a capacitor varying due to the geometric variations in the bottom of the spiral groove passing beneath. The capacitive variations, which represent recorded video information, are converted to electrical signal variations which are suitably processed and applied to a conventional television receiver for reproduction.

The stylus including the conductive surface is attached to the free end of a stylus arm. The stylus arm is freely pivoted at its other end on a support member attached to a stylus arm carrying structure. The stylus arm carrying structure desirably incorporates a suitable feed drive mechanism for driving the stylus arm assembly transversely across the disc in proper time relationship with the rotational speed of the disc whereby the attitude of the stylus conductive surface in the groove may be held relatively constant.

In video disc systems of the aforementioned Clemens' type (U.S. patent application, Ser. No. 126,772) it is desirable to maintain the relative motion between the disc and the stylus at a predetermined speed (e.g., 450 rpm) to obtain accurate reproduction of the recorded information. Although precise design and manufacture of the disc and playback apparatus minimize the speed errors, random cyclical errors sufficient to noticably affect the picture quality (e.g., by causing jitter) will remain. Cyclical speed errors emanate from several sources. For example, disc and turntable eccentricities, and disc manufacturing defects, to name a few. Errors caused by the aforementioned sources appear at the stylus once every revolution. By way of example, speed errors caused by the disc mounting eccentricity will occur at a frequency of 7.5 Hz (at disc rotational speed of 450 rpm). Speed errors caused by two disc manufacturing defects per groove (e.g., two scratches) will repeat at a frequency of 15 Hz (at disc rotational speed of 450 rpm), and so on. In U.S. Pat. No. 3,711,641, issued to R. C. Palmer on Jan. 16, 1973, entitled " Velocity Adjusting System," a system is disclosed for compensating cyclical speed errors by varying the position of the stylus in the groove in a direction tangential to the groove at the point of engagement of the stylus with the groove. This is accomplished by providing a support member for the stylus arm pivot, which is rendered subject to a correcting motion in response to cyclical speed errors. For satisfactory operation of the velocity adjusting system of the above type, the motion imparted to the support member of the stylus arm pivot assembly must be transmitted to the stylus substantially with minimum phase lag at the error frequencies. Therefore, it is desirable that the coupling between the stylus and the support member be relatively stiff in a direction tangential to the groove at the point of engagement.

The cyclical motion imparted to the support member by the velocity adjusting system results in wear and tear of the mating pivotal surfaces. The wear and tear of the pivotal surfaces, if not compensated, tends to inject a backlash component in the transmitted motion. Therefore, it is desirable that the pivot coupling be self-compensating to accommodate the wear and tear of the mating surfaces.

In video disc systems adequate bandwidth for monochrome and color display is obtained by rotating the disc at a speed substantially higher (e.g., 450 rpm) than conventional audio playback speeds (e.g., 33 and one-third rpm). For a given number of imperfections per groove, the higher the speed of rotation, the higher would be the frequency of disturbances with which the stylus arm assembly must cope for accurate tracking. These disturbances are mainly in two directions perpendicular to a direction tangential to the groove at the point of engagement. Therefore relatively high speeds employed in video disc systems make a sensitive stylus arm assembly desirable.

Playing time of a disc is a function of groove density (grooves per inch) and the rotational speed of the disc. For a given rotational speed of the disc, higher playing time can be obtained by packing more grooves per inch. Use of a high groove density results in narrow grooves. The tendency of the stylus arm assembly to skip and skate across the grooves on the disc increases with narrowness of the grooves. For a given width of the grooves the tendency of the stylus arm assembly to skip and skate can be decreased by reducing the torsional resistance offered by the pivot. A high rotational speed and a high groove density used in video disc systems make a low torsional resistance pivot desirable.

It is desirable, in order to facilitate inspection or replacement of the stylus, that the stylus arm pivot coupling permit relatively easy removal of the stylus arm from the stylus arm carrying structure without requirements for complicated manual disconnecting of the components.

It is advantageous to provide a stylus arm pivot assembly which permits standardization and modular construction compatible with low cost mass production processes.

In a playback system including a motorboard, a turntable, an information disc, a stylus, a stylus arm, and a stylus arm carrying structure, a universal stylus arm pivot coupling is provided for coupling the stylus arm to the carrying structure. The coupling comprises a generally horseshoe-shaped stylus arm holder affixed to the stylus arm. A plug, having a tapered end with a substantially circular cross-section, is fastened to the first leg of the arm holder. A support member, also generally horseshoe-shaped, is attached to the carrying structure. An opening, having dimensions permitting only a partial entry of and presenting complementary bearing surfaces for smooth engagement with the plug, is disposed in the first leg of the support member. A spring is coupled between the second legs of, respectively, the arm holder and the support member. The spring member continuously urges the plug into the opening and provides tracking pressure between the stylus and the disc during playback.

According to a further feature of the invention, the distance between the legs of the support member is adjustable for varying the tension in the spring.

According to still another feature of the invention, the points at which the spring is coupled to the second legs of the arm holder and the support member are adjustable for varying the tracking pressure between the stylus and the disc during playback.

The objects and advantages of the present invention may be recognized by those skilled in the art upon a reading of the following detailed description and an inspection of the accompanying drawings, in which.

DESCRIPTION OF THE INVENTION

Figure 1:
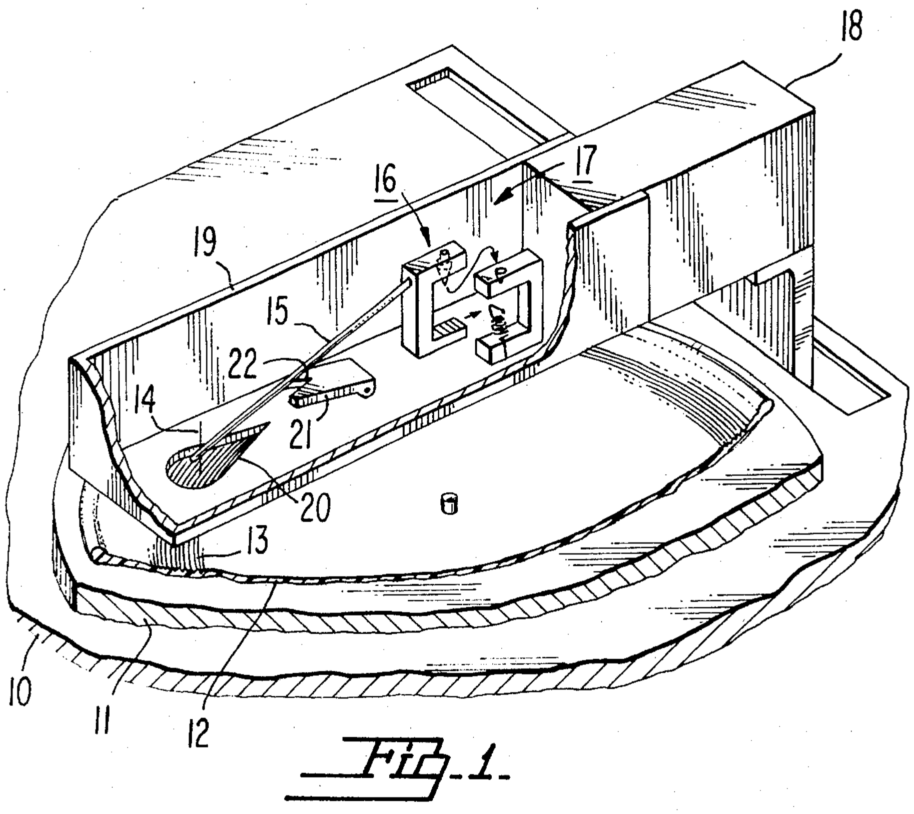
FIG. 1 is a partially cut-away view of a video disc system incorporating an embodiment of the present invention and illustrating the universal stylus arm pivot coupling disengaged from the carrying structure.

FIG. 1 illustrates a portion of an assembly comprising a motorboard 10 having a turntable 11 rotatably mounted thereon. The assembly is suitable for use in a video disc system such as disclosed in the aforementioned copending Clemens' application (U.S. patent application, Ser. No. 126,772). The surface of the turntable 11 is adapted to support a disc 12. A motor and a suitable engaging mechanism (not shown) drives the turntable 11 at a predetermined speed when the player is operative. The rotational motion of the turntable 11 is transmitted to the disc 12 via frictional contact between the turntable and the disc. Video information is contained in geometric variations in the bottom of a smooth spiral groove 13 on the surface of the disc 12. The disc surface includes a layer of conductive material which is preferably covered with a thin coating of dielectric material. A stylus 14, subject to positioning in the groove 13, includes a conductive surface which, together with the conductive material and dielectric coating of the disc, form a capacitor. When relative motion is established between the stylus 14 and the disc 12, an edge of the conductive surface included in the stylus, while riding in the groove 13, serves as an electrode of a capacitor varying due to the geometric variations in the bottom of the spiral groove passing beneath. The varying capacitance is coupled via the conductive surface of the stylus 14 and a conductive stylus arm 15 to a suitable signal processing means.

The other end of the stylus arm 15 is permanently inserted into a generally horseshoe-shaped stylus arm holder 16. The stylus arm holder 16 is flexibly coupled to a stylus arm carrying structure by a universal stylus arm pivot coupling 17 (described later) incorporating the principles of the present invention.

The stylus arm carrying structure comprises a velocity adjusting system 18 mounted on a transverse feed drive mechanism. The transverse feed drive mechanism causes the velocity adjusting system 18 carrying the stylus arm assembly to traverse radially inward towards the center of rotation of the disc. The transverse motion of the stylus arm assembly provides approximate lateral tracking of the stylus 14 in the groove 13 in proper time relationship with the rotation of the disc. Any discrepancy in the lateral tracking is compensated by the lateral movement of the stylus arm 15 at the pivot coupling 17. In video disc systems, the fragile walls of relatively narrow grooves of the disc cannot be dependably relied upon to pull the stylus arm assembly around the pivot across the entire recorded surface of the disc. Also in video systems utilizing variable capacitor concept, it is desirable for accurate reproduction that the conductive surface included in the stylus 14 maintain a substantially constant attitude toward the groove. The transverse feed drive mechanism satisfies the above requirements by transversing the pivoted end of the stylus arm 15 in proper time relationship with the stylus end engaged in the groove 13 so as to continuously maintain the longitudinal axis of the stylus arm substantially tangential to the groove at the point of engagement.

Illustratively, velocity adjusting system 18 may be of the type disclosed in U.S. Pat. No. 3,711,641, issued to R. C. Palmer on Jan. 16, 1973, entitled "Velocity Adjusting System." In the Palmer's system the cyclical speed errors in the relative speed between the disc 12 and the stylus 14 are compensated by varying the position of the stylus in relation to the disc. Circuit means provide an error signal representative of deviation of the instantaneous speed from the predetermined speed. Transducer means responsive to the error signal, impart motion to the stylus arm pivot coupling 17 in a manner that minimizes the speed error.

A box-like shield enclosure 19, attached to the velocity adjusting system 18, houses the stylus arm assembly. In the operative position the stylus arm 15 protrudes through an aperture 20 in the bottom of the shield enclosure 19 permitting the stylus 14 to ride in the groove 13 of the disc 12. In the inoperative position, a pivotally mounted stylus arm centering ramp 21 sustains the free end of the stylus arm 15. As the stylus arm 15 is lifted out of engagement by the centering ramp 21, which may be manually or automatically actuated, the V-shaped slot 22 provided in the centering ramp permits the stylus arm to gravitate to the center of the ramp. As the stylus arm 15 is lowered for playback, the V-shaped slot 22 causes the stylus 14 to descend substantially centrally for smooth engagement with the spiral groove 13 in a manner that minimizes the likelihood of misalignment. It is noted that in the operative position the centering ramp 21 is out of contact with the stylus arm 15 to permit free pivotal movement of the stylus arm.

Figure 2:
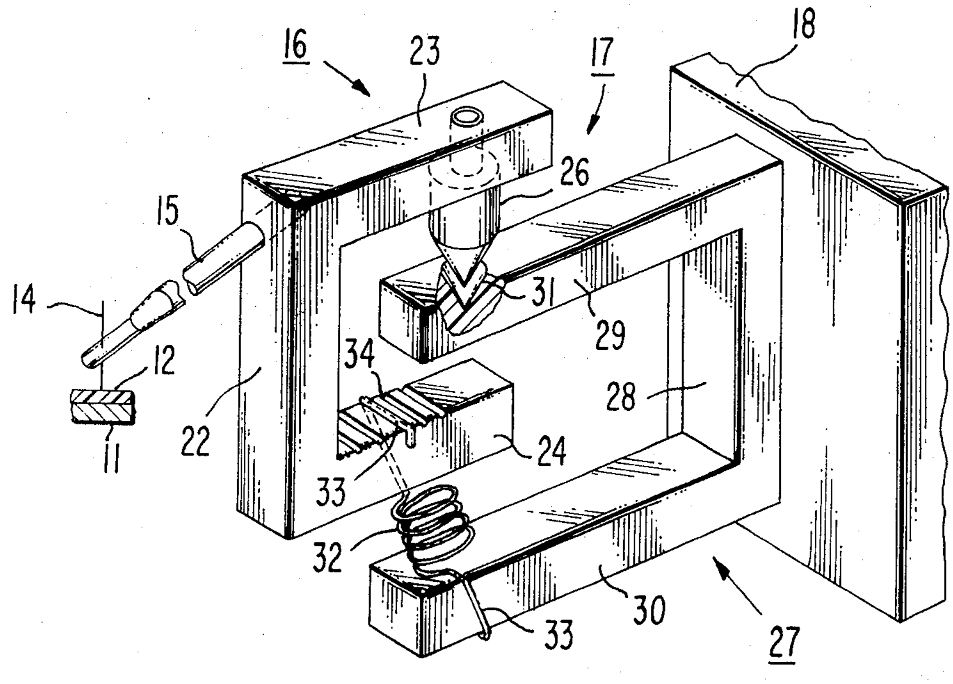
FIG. 2 is a partially cut-away perspective view of the details of one embodiment of the universal stylus arm pivot coupling of FIG. 1.
Figure 3:
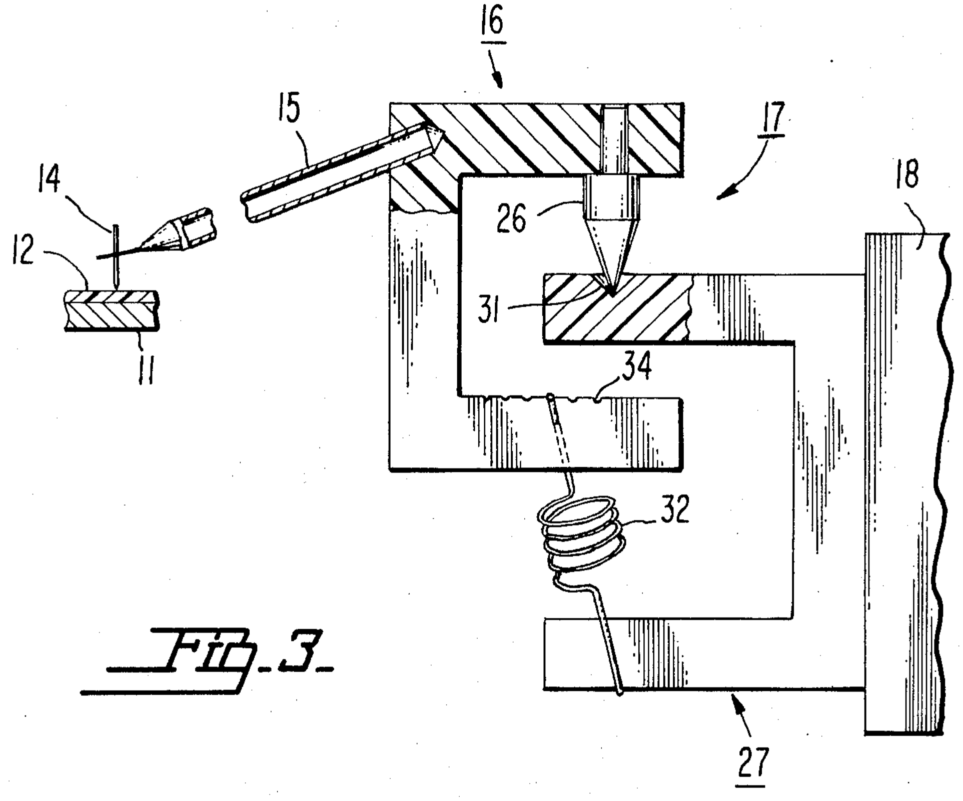
FIG. 3 illustrates a sectional end view of the embodiment of the universal stylus arm pivot coupling depicted in FIG. 2.

As illustrated in FIGS. 2 and 3, in the preferred embodiment of the present invention, the universal stylus arm pivot coupling includes a generally horseshoe-shaped stylus arm holder 16. The stylus arm holder 16 is comprised of the back member 22 and the leg members 23 and 24. The stylus arm 15 is received in a closed-ended hole 25 in the back member 22. A plug 26, having a tapered end with substantially circular cross-section, is secured in another through opening in the first leg 23. A generally horseshoe-shaped support member 27 is comprised of the back member 28 and the leg members 29 and 30. The back member 28 is attached to a movable member of the velocity adjusting system 18 mounted on the transverse speed drive mechanism. A cup-shaped receptacle 31, having dimensions permitting only a partial entry of and presenting complementary bearing surfaces for smooth engagement of plug 26, is disposed in the first leg 29 of the support member 27. The angle included between the bearing surfaces of the receptacle 31 at the vertex is greater than the angle subtended by the pivotal surfaces of the plug 26 to allow free rocking movement of the plug in the receptacle. When the plug 26 is received by the receptacle 31, the legs 23 and 24 of the stylus arm holder 16 straddle the first leg 29 of the support member 27 and the legs 29 and 30 of the support member straddle the second leg 24 of the stylus arm holder. The distance between the inside surfaces of the legs 23 and 24 of the stylus arm holder 16 is greater than the protruding portion of the plug and the height of the first leg 29 of the support member 27 to permit free rocking movement of the stylus arm holder.

A spring member 32 is coupled between the second legs 24 and 30 of both the stylus arm holder 16 and the support member 27. The spring member 32 persistently urges the plug 26 downward into the receptacle 31. The spring member also urges the plug 26 to orient such that the strain in the spring member is minimum. The axis of the spring member 32 and the axis of the plug 26 preferably lie in a plane substantially perpendicular to the surface of the disc 12. The tracking pressure between the disc 12 and the stylus 14 is adjusted by varying the angle included between the axis of the spring 32 and the axis of the plug 26. The variation of the angle is facilitated by the engaging of clip-end 33 in one of the notches 34 provided in the second leg 24 of the stylus arm holder 16. The moment exerted by the spring 32 on the stylus arm 15 through the stylus arm holder 16 is balanced by the reactive force exerted (a) by the surface of the disc 12 on the stylus 14 during playback, and (b) by the centering ramp 21 on the stylus arm 15 while the player is not in operation. It is noted that the distance between inside surfaces of the legs 29 and 30 of the support member 27 is greater than unstrained length of the spring member 32 and the height of the second leg 24 of the stylus arm holder 16, also in order to allow free rocking movement of the stylus arm holder.

Figure 4:
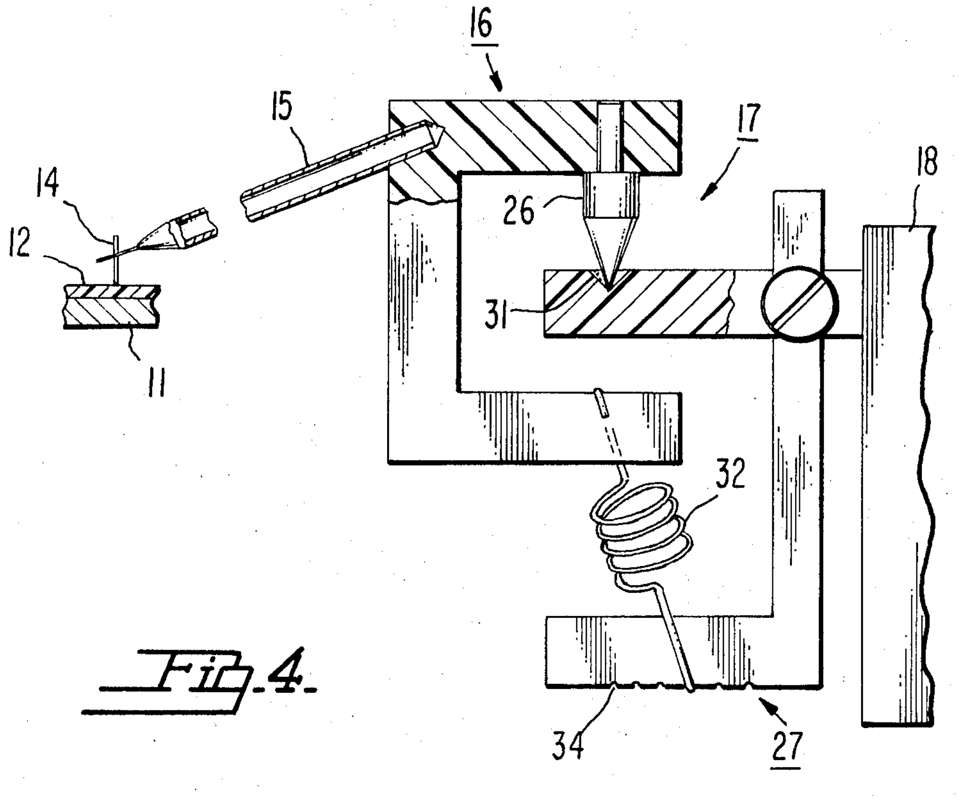
FIG. 4 illustrates a sectional end view of another embodiment of the universal stylus arm pivot coupling of FIG. 1.

FIG. 4 illustrates a sectional end view of another embodiment of the universal stylus arm pivot coupling. In the embodiment of FIG. 4, the distance between the legs of the horseshoe-shaped support member 27 is adjustable for varying the tension in the spring 32. The adjustment may be desirable to obtain relatively stiff coupling, between the stylus arm 15 and the support member 27 in a direction substantially tangential to the groove at the point of engagement, with minimum wear of the pivotal surfaces. An aperture is provided in the first leg of the support member 27 through which the vertical portion of the generally L-shaped second leg of the support member is movably threaded. A knurled-headed thumb screw arrangement is provided in the first leg of the support member 27 to secure the second leg at a particular position with respect to the first leg. In the FIG. 4 embodiment, the spring end receiving notches 34 facilitating tracking pressure adjustment are provided in the second leg of support member 27.

Both illustrated embodiments of the invention have a number of advantages as delineated in the following summary.

The weight distribution and the geometry of the stylus arm assembly is such that in the operative position the line joining the center of gravity of the stylus arm assembly and the pivotal center, i.e., the center of the receptacle 31, is substantially parallel to the direction of motion imparted to the stylus arm assembly by the velocity adjusting system 18. This feature prevents the plug 26 attached to the stylus arm from being jerked out of the support member 27 which may cause damage to the disc and the stylus.

As indicated, for satisfactory operation of the velocity adjusting system 18 the motion imparted to the support member 27 of the stylus arm pivot must be transmitted with minimum phase lag to the stylus 14 at error frequencies. As shown in FIGS. 2, 3 and 4, the motion is transmitted by the velocity adjusting system 18 to the support member 27. Note that any relative motion between the plug 26 and the receptacle 31 increases the strain in the spring 32. As indicated before the spring 32 persistently urges the plug 26 to assume a position that minimizes the strain and therefore the plug follows the support member 27 with minimum phase lag. The motion of the plug is transmitted to the stylus 14 via the stylus arm holder and the stylus arm 15.

The self-compensating feature of the stylus arm pivot coupling is by virtue of the fact that as the mating pivotal surfaces wear out, the tip of the plug 26 automatically sinks further into the receptacle 31 and consumes slack. Thus it will be seen that after initial setting of the stylus arm assembly in proper operative position, no subsequent readjustments are necessary.

The stylus arm pivot coupling provides an arrangement which is compliant in the two directions perpendicular to a direction tangential to the groove at the point of engagement and relatively stiff in the direction tangential to the groove at the point of engagement. The low mass stylus arm assembly is sensitive to the imperfections (both vertical and lateral) in the disc surface such as warps and eccentricities. As the pivot offers a low torsional resistance, the tendency of the stylus arm assembly to skip and skate is reduced. The mechanism is self-compensating and its simple construction is compatible with low cost mass production processes.

What is claimed is:

1. In a playback system including a board, a turntable mounted for rotation relative to said board, said turntable having a surface adapted to receive a disc, said disc including a spiral groove with information recorded therein, a stylus arm, a stylus subject to positioning in said spiral groove for recovering said information, said stylus being affixed to a free end of said stylus arm, and a stylus arm carrying structure linked to said board; a universal stylus arm pivot coupling, comprising:

a generally horseshoe-shaped stylus arm holder affixed to the end of said stylus arm remote from said free end;

a plug having a tapered end with substantially circular cross-section, said plug being fastened to a first leg of said stylus arm holder;

a generally horseshoe-shaped support member attached to said stylus arm carrying structure, an opening being disposed in a first leg of said support member and having dimensions permitting only a partial entry of and presenting complementary bearing surfaces for smooth engagement with said plug; and a spring member coupled between the second legs of said stylus arm holder and said support member, said spring member during operation of said coupling continuously urging said plug into said opening and further tending to align the axis of said plug with the axis of said spring member thereby tending to minimize the strain in said spring member.

2. A system as defined in claim 1 including further means for adjusting the distance between the legs of said support member for varying the tension in said spring member.

3. A system as defined in claim 1 wherein the angle subtended between the axis of said plug and the axis of said spring is adjustable to control the tracking pressure between said stylus and said disc during playback.

4. A system as defined in claim 3 wherein said spring includes first and second terminal portions for embracing respective ones of said second legs, and wherein at least one of said second legs includes a plurality of parallel notches each dimensioned for reception of a terminal portion of said spring, whereby said adjustment of said tracking pressure may be affected by orienting said spring for terminal portion reception in a selected one of said notches.

* * * * *